(12) United States Patent
Goss

(10) Patent No.: US 7,114,053 B2
(45) Date of Patent: Sep. 26, 2006

(54) VIRTUAL-TO-PHYSICAL ADDRESS CONVERSION IN A SECURE SYSTEM

(75) Inventor: Steven Charles Goss, Rockwall, TX (US)

(73) Assignee: Texas Instruments Incorporated, Dallas, TX (US)

(*) Notice: Subject to any disclaimer, the term of this patent is extended or adjusted under 35 U.S.C. 154(b) by 391 days.

(21) Appl. No.: 10/645,088

(22) Filed: Aug. 21, 2003

(65) Prior Publication Data
US 2005/0044338 A1 Feb. 24, 2005

(51) Int. Cl.
*G06F 12/08* (2006.01)

(52) U.S. Cl. ...................................... 711/203

(58) Field of Classification Search ............ None
See application file for complete search history.

(56) References Cited

U.S. PATENT DOCUMENTS 6,581,132 B1 * 6/2003 Kakinuma et al. .......... 711/103
6,931,504 B1 * 8/2005 Wolczko et al. ............ 711/165
2003/0163718 A1 * 8/2003 Johnson et al. ............. 713/193

* cited by examiner

*Primary Examiner*—Mano Padmanabhan
*Assistant Examiner*—David Masdon
(74) *Attorney, Agent, or Firm*—Ronald O. Neerings; Wade James Brady, III; Frederick J. Telecky, Jr.

(57) ABSTRACT

In some embodiments, a storage medium comprises application software that performs one or more operations and that directly facilitates the conversion of a virtual memory address to a physical memory address. The application software comprises instructions that initialize an application data structure (e.g., an object or array) usable by the application software to facilitate the conversion of memory addresses and also comprises instructions that store pointers to the virtual memory addresses to be converted. In other embodiments, a system comprising a secure and non-secure memory subsystem is disclosed. Before execution of an application stored in the secure sub-system, a list of pointers to parameters contained in virtual memory is created. The virtual memory addresses referenced by the pointers in the list are converted to pointers to physical memory addresses before execution of the application.

15 Claims, 4 Drawing Sheets

VIRTUAL-TO-PHYSICAL ADDRESS CONVERSION IN A SECURE SYSTEM

BACKGROUND OF THE INVENTION

1. Technical Field of the Invention

The present invention relates generally to memory and more particularly methods for accessing memory systems.

2. Background Information

Many types of devices require memory for the operation of the device. Such devices may include cellular phones and personal organizers. The total memory available to the device may include "virtual" and "physical" memory. Physical memory may be accessed via physical memory addresses and may take the form of random access memory (RAM) circuits that physically exist in the device. In contrast to physical memory, virtual memory may be accessed via virtual memory addresses and may take the form of a slower access magnetic storage medium (e.g., a disk drive) that performs functions similar to physical memory. For example, a hard drive may store and retrieve data similar to a RAM circuit. Virtual memory typically is used when a device does not have enough physical memory to store all applications that the user desires to run concurrently.

Some devices with virtual and physical memory may execute sensitive applications, such as user authentication and encryption, in a "secure" operating mode. The secure operating mode may provide a secure environment in which the sensitive applications may not have access to virtual memory. Thus, the sensitive applications may retrieve input and store output from only physical memory. However, the input and output to the sensitive applications desirably may reside in virtual memory. Efficient techniques that convert virtual memory addresses to physical memory addresses, thereby enabling the execution of the sensitive applications, are desirable.

BRIEF SUMMARY

In some embodiments, a storage medium comprises application software that performs one or more operations and that directly facilitates the conversion of a virtual memory address to a physical memory address. The application software comprises instructions that initialize an application data structure (e.g., an object or array) usable by the application software to facilitate the conversion of memory addresses and also comprises instructions that store pointers to the virtual memory addresses to be converted. In other embodiments, a system comprising a secure and non-secure memory subsystem is disclosed. Before execution of an application stored in the secure sub-system, a list of pointers to parameters contained in virtual memory is created. The virtual memory addresses referenced by the pointers in the list are converted to pointers to physical memory addresses before execution of the application.

NOTATION AND NOMENCLATURE

Certain terms are used throughout the following description and claims to refer to particular system components. As one skilled in the art may appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

The subject matter disclosed herein generally is directed to a software solution executed by a processor that facilitates or performs the conversion of virtual memory addresses to physical memory addresses. Merely by way of example, the embodiments described herein are directed to a software solution written in a high-level programming language (e.g., C).

The processor may execute at least two types of applications, sensitive and non-sensitive applications. The sensitive applications preferably perform sensitive procedures, such as user authentication and encryption, and may be executed only in a secure operating mode. The non-sensitive applications preferably perform common procedures, such as text editing and file transfers, and may be executed only in a non-secure operating mode.

The sensitive applications may have constraints on system resources while in the secure operating mode. One such constraint is the inaccessibility of virtual memory, which is considered inherently less secure than physical memory. However, the sensitive applications may require input and output, referred to as "parameters", that reside in virtual memory. In accordance with the preferred embodiment, a process may facilitate the conversion of virtual memory addresses to physical memory addresses, thereby enabling the execution of a sensitive application.

Figure 1:
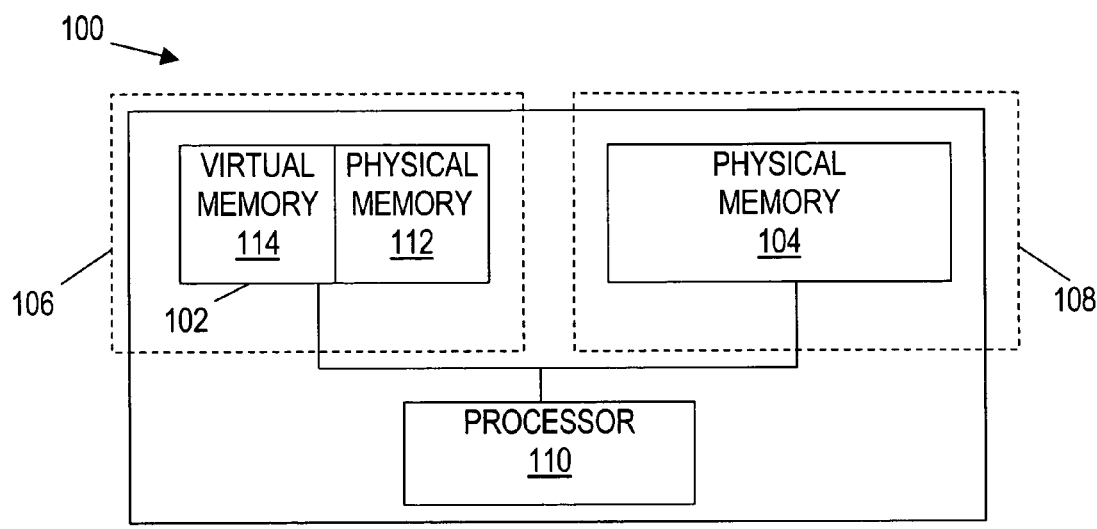
FIG. 1 shows a diagram of a system in accordance with preferred embodiments of the invention and including two memory subsystems and a processor.

Referring now to FIG. 1, a device 100 is shown in accordance with a preferred embodiment of the invention. As shown, the device 100 preferably includes at least two memory subsystems 102 and 104 and a processor 104. The memory subsystem 102 contains physical memory 112 and virtual memory 114 for storing and retrieving data. Both physical memory 112 and virtual memory 114 reside in a non-secure portion 106 of the device 100. Memory subsystem 104 preferably contains only physical memory. This physical memory resides in a secure portion 108 of the device 100. Both physical memories 112 and 104 may contain random access memory (RAM), read only memory (ROM), or a combination of RAM and ROM memory. Although the memory subsystems 102 and 104 are shown as distinct memory units, a single memory unit that is divided into a secure and non-secure region similarly may be used. A processor 110 that executes applications is coupled to the memory subsystems 102 and 104. Sensitive applications, as previously discussed, preferably are stored in the memory sub-system 104, while non-sensitive applications are preferably stored in memory subsystem 102. Other components and configurations (not specifically shown) may be included as desired. While device 100 may be representative of, or adapted to, a wide variety of electronic systems, an exemplary electronic system may comprise a laptop computer.

In accordance with the preferred embodiment of the invention, the device 100 may operate in at least one of two modes, secure and non-secure. When operating in secure mode, the device 100 and the sensitive applications may only access the physical memory contained within device 100, not the virtual memory. Thus, while operating in secure mode, device 100 may access the physical memory 104 and 112 and may not access the virtual memory 114.

When operating in the non-secure mode, the device 100 preferably executes non-sensitive applications. These non-sensitive applications may include general-purpose operating systems (e.g., Microsoft Windows®) and other common applications, such as compression and text editing utilities. When operating in the non-secure mode, the device 100 may only access memory elements contained within the non-secure portion 106. Thus, while operating in the non-secure mode, the device 100 may only access the physical memory 112 and the virtual memory 114.

Figure 2:
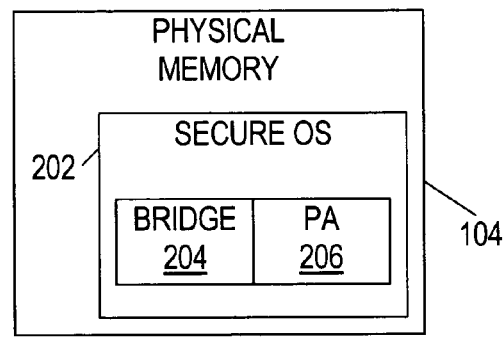
FIG. 2 further illustrates the first memory subsystem in FIG. 1.

Referring now to FIG. 2, the contents of memory subsystem 104 are shown in accordance with the preferred embodiments of the invention. A secure operating system 202 ("secure OS") preferably contains or interacts with protected applications 206 ("PA") and a bridge function 204. As discussed above, the protected applications 206 may include the sensitive applications. The protected applications 206 preferably take the form of low-level code (e.g., assembly) stored in read-only physical memory 104 that may be executed only when device 100 is operating in the secure mode. The mode (i.e., secure or non-secure) of device 100 preferably may be changed through the use of the bridge function 204. The bridge function 204 preferably comprises a low-level function that facilitates the switching of modes in the device 100.

Figure 3:
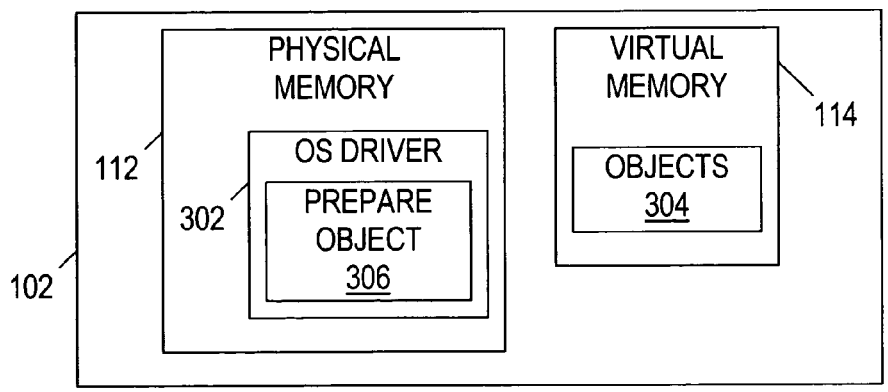
FIG. 3 further illustrates the second memory subsystem in FIG. 1.

FIG. 3 shows the preferred contents of memory subsystem 102. Two types of memory, physical memory 112 and virtual memory 114, are contained within the memory subsystem 102. The physical memory 112 preferably contains an operating system driver 302 ("OS driver"). The OS driver 302 contains low-level code that controls interactions with a high-level, non-secure operating system (not specifically shown). As opposed to the secure OS 202 (FIG. 2), the non-secure operating system runs only while device 100 is operating in the non-secure mode. In addition, the OS driver 302 may contain a function, referred to as "prepare object" 306, that is designed to facilitate the execution of the protected applications 206 and a list (not specifically shown) of all applications in protected applications 206. This list preferably includes the number and type of inputs required by a protected application and may be referred to as the "supported applications list". In alternative embodiments, the OS driver 302 may contain executable code comprising the protected applications 206 rather than the supported applications list.

The second component of the memory subsystem 102, the virtual memory 114, preferably contains objects 304. The objects 304 may contain data structures such as integers, arrays (not specifically show) used by the high-level operating system.

In accordance with the preferred embodiment of the invention, the execution of a protected application 206 only occurs while device 100 is operating in the secure mode. As discussed above, each protected application 206 may require one or more parameters. For example, a protected encryption application that encrypts data may require three parameters. The first parameter may include data to be encrypted; the second parameter may include an encryption key to encrypt the data; and the third parameter may be an identifier or pointer to an output buffer that stores the resulting encrypted data. Thus, two input parameters and one output parameter are utilized by the protected encryption application. However, one or more of the parameters used by the protected encryption application may be stored in the virtual memory 114. Since the virtual memory 114 is not accessible while device 100 is operating in the secure mode, a virtual-to-physical address conversion is performed to allow the protected encryption application access to the needed parameters. Before the conversion occurs, all parameters residing in the virtual memory 114 preferably are transferred, if necessary, to the physical memory 112 in a process referred to as "swapping." The following discussion presents an exemplary execution by the high-level operating system of the protected encryption application that has the three parameters, as previously discussed, residing in the virtual memory 114.

Figure 4:
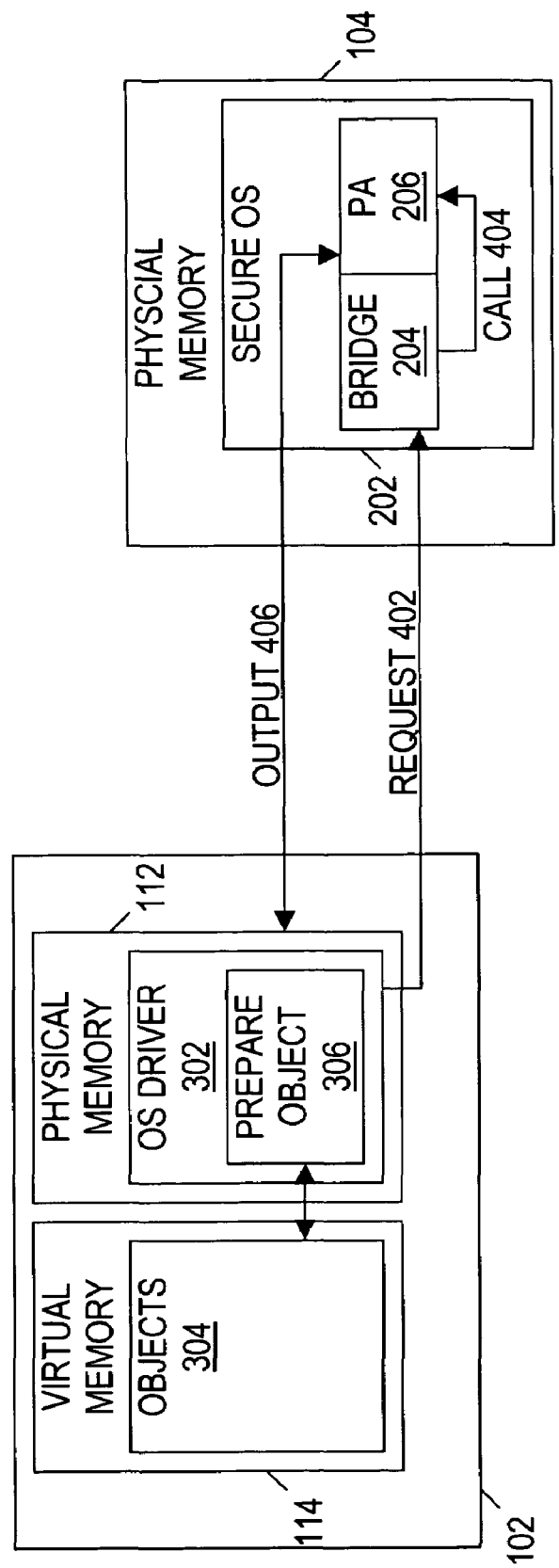
FIG. 4 shows a data flow associated with the execution of an application contained in the first memory subsystem in accordance with preferred embodiments of the invention.

Referring now to FIG. 4, the data flow associated with the exemplary execution of the protected encryption application is shown. The OS driver 302 may locate in the virtual memory 114 one or more parameters for the protected encryption application contained in the objects 304 that reside in the virtual memory 114. These parameters are prepared by the prepare object function 306 and are passed to the bridge function 204 via a request 402. During the preparation, the parameters located in the virtual memory 114 are copied, if necessary, to the physical memory 112. In addition, the virtual memory addresses of these parameters are converted to physical memory addresses and passed via request 402 to bridge 204. The bridge 204 receives the request 402, switches the device 100 to the secure operating mode, and issues a protected procedure call 404 to the protected applications 206. The appropriate protected application (i.e., the protected encryption application) is executed using the parameters that now reside in the physical memory 112. The protected encryption application then stores the output 406 of the application to the physical memory 112.

Figure 5:
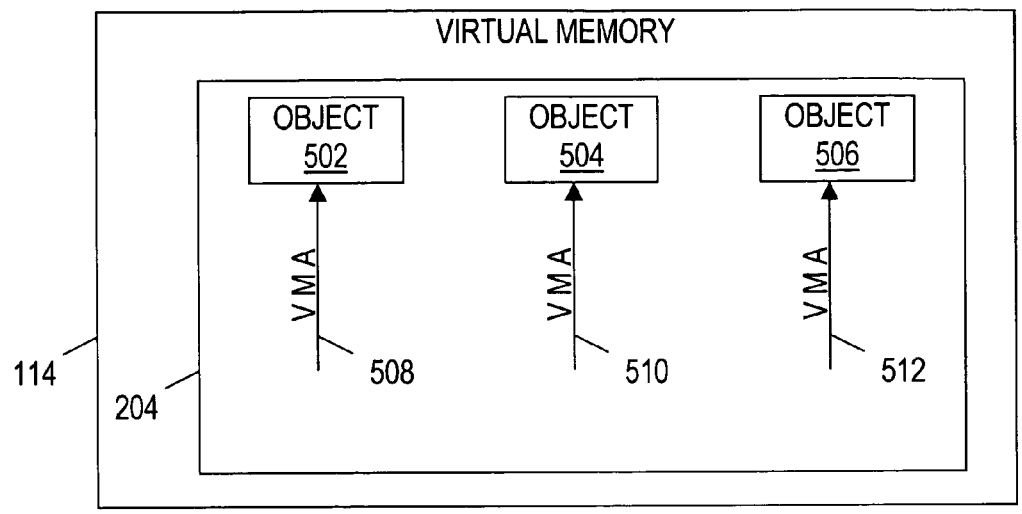
FIG. 5 shows a layout of objects in the second memory subsystem in accordance with preferred embodiments of the invention.

FIG. 5 illustrates the layout of three exemplary parameters to the protected encryption application that reside in the virtual memory 114. The following discussion will describe an exemplary case in which the three objects 502, 504, and 506 are prepared by the prepare object function 306. Object 502 may represent the data to be encrypted by the protected encryption application; object 504 may be the key with which the data is encrypted; and object 506 may identify an output buffer designed to store the encrypted data. Virtual memory addresses 508, 510, and 512 may reference objects 502, 504, and 506 respectively.

Figure 6:
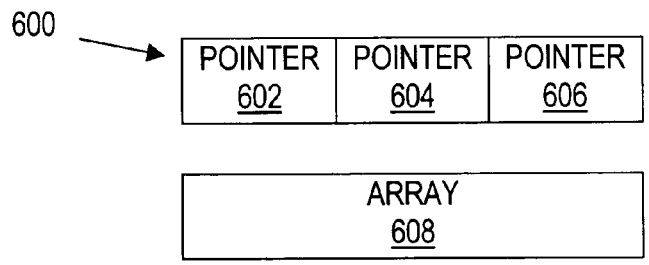
FIG. 6 illustrates a layout of two arrays used in accordance with preferred embodiments of the invention.

Referring now to FIG. 6, two data arrays 600 and 608 preferably are created by the prepare object function 308 in order to prepare the parameters of the protected encryption application. The first array 600 preferably initially holds three pointers 602, 604, and 606 to the virtual memory addresses 508, 501, and 512 that reference the three parameters used by the protected encryption application.

Figure 7:
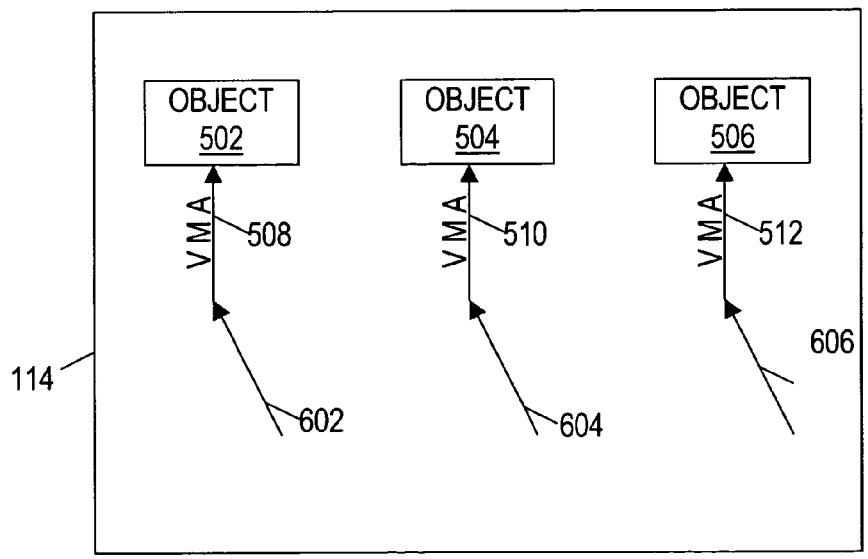
FIG. 7 shows a layout of objects in memory before virtual-to-physical address conversion.

Referring now to FIG. 7, the layout of the three pointers in the virtual memory 114 is shown. Pointers 602, 604, and 606 reference virtual memory addresses 508, 510, and 512 respectively. After each parameter of the protracted encryption application has a pointer that references it in array 600, the prepare object function 306 preferably checks the supported application lists and verifies that the number and type of required parameters for execution of the protected encryption application has been satisfied. After successful verification, each of the three pointers 602, 604, and 606 is copied into the array 608 (FIG. 6).

Figure 8:
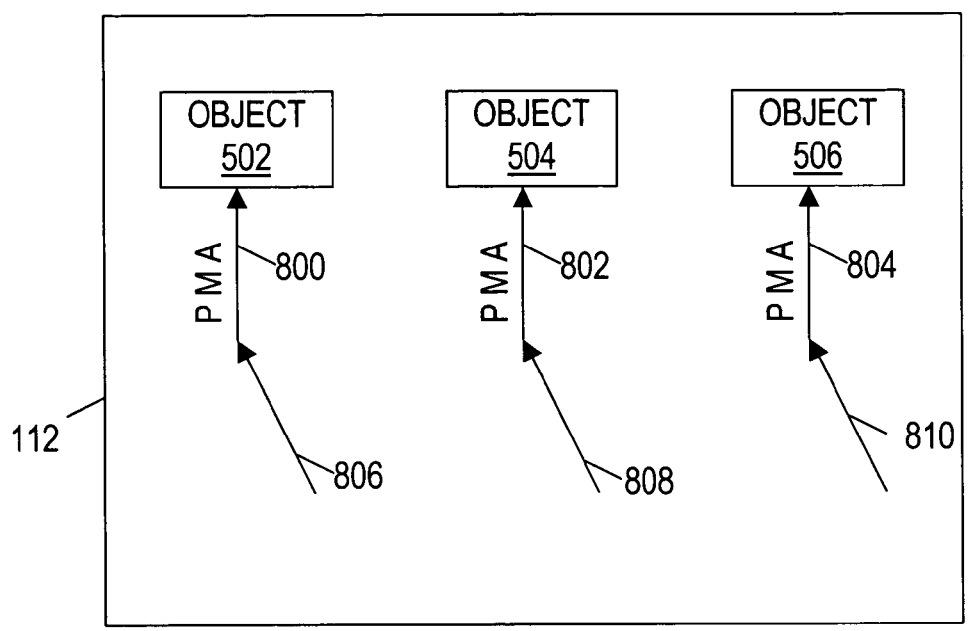
FIG. 8 shows a layout of objects in memory after virtual-to-physical address conversion.

Once the pointers 602, 604, and 606 have been copied to array 608, a virtual-to-physical address conversion process may be employed on each virtual address referenced by a pointer in array 600. This process entails swapping the parameters referenced by a virtual memory address to the physical memory 112. A pointer to a location in the physical memory 112 may then be created by the prepare object function 306 for each parameter. FIG. 8 shows the layout of the pointers after the virtual-to-physical conversion process has occurred. Each virtual address 508, 510, and 512 (FIG. 7) has been replaced with a corresponding physical address 800, 802, and 804. Physical addresses 800, 802, 804 respectively reference objects 502, 504, and 506 that have been moved, if necessary, into the physical memory 112. Pointers 806, 808, and 810 are created to reference the physical memory addresses 800, 802, and 804, and preferably replace the pointers 602, 604, and 606 in array 600, respectively. Thus, array 600 now contains three pointers 806, 808, and 810 to physical memory addresses 800, 802, and 804 that reference the three parameters of the protected encryption application. The preparation of the parameters by the prepare object function 306 is now preferably complete.

The following discussion makes reference to FIGS. 4, 6, and 8. After the three parameters to the protected encryption application have been prepared by the prepare object function 306, the two arrays 600 and 608 (FIG. 6) are passed to the bridge 204 (FIG. 4) via request 402. The bridge 204 receives the arrays 600 and 608 and switches device 100 to the secure operating mode. The protected encryption application is then executed by the bridge 204 through the procedure call 404. Since the pointers contained within array 600 now reference physical memory addresses, the protected encryption application may directly utilizes pointers 806 and 808 (FIG. 8) to obtain input parameters 502 and 504, respectively. After the protected encryption application completes, the encrypted data is written to the physical memory location referenced by pointer 810.

When the bridge 204 receives notification of successful execution of the protected encryption application, the pointers in array 600 preferably are replaced by the pointers in array 608. Thus, the array 600 now contains three pointers 602, 604, and 606 to virtual memory addresses.

The device 100, having fulfilled the protected procedure call, may now operate in non-secure mode. The pointer 606 in array 600 may be used by the high-level operating system to obtain the encrypted data (i.e., object 506) that resulted in the execution of protected encryption application.

Although the objects used in the foregoing discussion possessed only a single virtual address, multiple-tiered structures such as multi-dimensional arrays may correspondingly be used. These multiple-tiered structures may possess multiple references to virtual addresses. The prepare object function 306 may find all related virtual addresses in the multiple-tiered structure and store a pointer in array 600 to each virtual address, thereby enabling the execution of a protected application.

Numerous additional variations and modifications will become apparent to those skilled in the art once the above disclosure is fully appreciated. It is intended that the following claims be interpreted to embrace all such variations and modifications.

What is claimed is:

1. An apparatus comprising application software that performs one or more operations and that facilitate a conversion of virtual memory addresses to physical memory addresses in a device, said application software comprising:
    instructions that initialize an application data structure usable by the application software to facilitate the conversion of virtual memory addresses to physical memory addresses in the device; and
    instructions that store pointers to virtual memory addresses in the application data structure; and
    instructions that replace the pointers to virtual memory addresses in the application data structure with pointers to physical memory addresses before the execution of a protected application.

2. The apparatus of claim 1 wherein the instructions that initialize are executed when the device is in a non-secure mode.

3. The apparatus of claim 1 wherein the application data structure comprises an application array.

4. The apparatus of claim 1 wherein the instructions that store utilize a multi-tiered structure to store virtual addresses.

5. The apparatus of claim 3 wherein the instructions that initialize the application array comprise instructions that initialize a multi-dimensional array.

6. The storage medium of claim 3 wherein the instructions that initialize the application array comprise instructions that initialize a single-dimensional array.

7. A device, comprising:
    a secure physical memory subsystem containing a protected application;
    a non-secure virtual memory subsystem containing virtual memory;
    a processor coupled to the secure and non-secure memory subsystems; and
    logic that converts a pointer to a virtual memory address associated with a parameter to the protected application to a pointer to a physical memory address.

8. The device of claim 7 wherein the non-secure subsystem further comprises physical memory.

9. The device of claim 7 wherein the non-secure subsystem contains a copy of the protected application.

10. A method comprising:
    building a list of pointers to one or more virtual memory addresses associated with an object;

converting the one or more virtual memory addresses to one or more physical memory addresses; and replacing the pointers to one or more virtual memory addresses with pointers to the one or more physical memory addresses;

wherein the object is a parameter to a protected application.

11. The method of claim 10 wherein the building a list further comprises storing the list into an array.

12. The method of claim 11 wherein the array comprises a multi-dimensional array.

13. The method of claim 10 wherein the object comprises a multi-tiered structure.

14. The method of claim 10 wherein the object comprises multiple objects.

15. The method of claim 10 wherein the converting further comprises executing the protected application.

* * * * *